(12) United States Patent
Muthu et al.

(10) Patent No.: US 12,530,728 B2
(45) Date of Patent: Jan. 20, 2026

(54) ARTIFICIAL INTELLIGENCE DRIVEN SYSTEM FOR ACCELERATED SOFTWARE APPLICATION CONTENT GENERATION

(71) Applicant: INTUIT INC., Mountain View, CA (US)

(72) Inventors: Malathy Muthu, The Woodlands, TX (US); Corinne L. Finegan, Los Altos, CA (US); Richard J. Becker, Alberta (CA); Goutham Kallepalli, Sunnyvale, CA (US); Olabode Idowu, Alberta (CA); Karelia Del Carmen Pena-Pena, Wilmington, DE (US); Ankita Sinha, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 6 days.

(21) Appl. No.: 18/392,137

(22) Filed: Dec. 21, 2023

(65) Prior Publication Data
US 2025/0209543 A1 Jun. 26, 2025

(51) Int. Cl.
*G06Q 40/12* (2023.01)
*G06N 20/00* (2019.01)

(52) U.S. Cl.
CPC ........... *G06Q 40/123* (2013.12); *G06N 20/00* (2019.01)

(58) Field of Classification Search
None
See application file for complete search history.

(56) References Cited

U.S. PATENT DOCUMENTS

| | | | |
|---|---|---|---|
| 10,373,268 B1* | 8/2019 | Orphys | G06Q 40/123 |
| 11,526,261 B1* | 12/2022 | Leach | G06F 17/18 |
| 2019/0114360 A1* | 4/2019 | Garg | G06F 16/1794 |
| 2021/0295103 A1* | 9/2021 | Tanniru | G06V 10/7747 |
| 2022/0319143 A1* | 10/2022 | Wyle | G06V 30/147 |
| 2023/0049167 A1* | 2/2023 | Wilson | G06V 30/19107 |
| 2023/0252224 A1* | 8/2023 | Tran | G06F 40/56 715/256 |
| 2024/0103691 A1* | 3/2024 | Tang | G06Q 30/0246 |
| 2024/0394813 A1* | 11/2024 | Trinh | G06N 20/00 |

* cited by examiner

*Primary Examiner* — William J Jacob
(74) *Attorney, Agent, or Firm* — Patterson + Sheridan, LLP (57) ABSTRACT

Aspects of the present disclosure relate to generating software application content related to forms. Embodiments include providing a form and a prompt comprising instructions to a first machine learning model. The first machine learning model may be used to extract first information from the form based on an embedding representation of the form. Based on the first extracted information, a second prompt may be generated and provided to the first machine learning model. Then, based on the second prompt, the first machine learning model may extract second information from the form. The first information and the second information may then be provided to a generative machine learning model that is then used to generate software application content based on the first and second information.

20 Claims, 6 Drawing Sheets

ARTIFICIAL INTELLIGENCE DRIVEN SYSTEM FOR ACCELERATED SOFTWARE APPLICATION CONTENT GENERATION

TECHNICAL FIELD

Aspects of the present disclosure relate to techniques for accelerating the process of generating software application content. In particular, techniques described herein involve using artificial intelligence and prompt engineering to generate new software application content based on forms, existing software application content, and other documents related to forms.

BACKGROUND

Every year millions of people, businesses, and organizations around the world utilize software applications to assist with countless aspects of life. For example, many individuals and businesses rely on software applications for performing complex activities such as filing tax returns or completing loan applications. These software applications simplify what would otherwise be complex and tedious tasks.

Software applications often serve purposes that involve assisting users with completing complicated forms. For example, millions of people rely on tax software applications to assist them with completing and filing their income tax returns. Creating tax software applications and keeping such applications up to date requires an understanding of thousands of tax forms, as well as thousands of pages of filing instructions and other documents that are related to the forms. This makes creating tax software content an arduous task that requires an immense amount of manual labor to perform. Also, the complexity and length of the task raises a chance for human error. The challenges inherent in creating tax software application content are inherent in creating software application content for applications related to other types of forms as well. For instance, creating content for software applications that help users complete loan-related forms or medical forms requires significant expertise and effort as well. Furthermore, there are many challenges associated with automating aspects of form-based software application content generation. For example, while existing machine learning technologies are capable of generating content, such technologies are not equipped to handle the complexities of extracting information from dense forms such as tax forms and generating content based on this information.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for generating software application content.

According to certain embodiments, one more machine learning models are used in a process for automatically generating software application content based on data in documents such as forms and related documents. In some cases, one or more prompts are dynamically generated and provided to one or more machine learning models in order to extract information from documents (e.g., a form and related documents) and to generate application content based on the extracted information. providing the machine learning model with prompts and embeddings of forms used to generate the existing software application content. The training enables the second machine learning model to generate software application content based on the extracted information that is consistent with existing software application content. In some embodiments, a pre-trained model may be further trained (e.g., fine-tuned) by receiving user feedback in response to generated software application content. This allows the second machine learning model to be continuously improved and retrained based on newly generated software application content and user feedback.

In certain embodiments, a user feedback engine may be used to collect and process user feedback. The feedback may be an answer to a multiple choice question about the quality of the generated software application content. The feedback may be natural language feedback. The feedback engine may include a natural language processing model such as a large language model or another language processing technique. A natural language processing model may be applied to natural language feedback in order to determine what the user liked or did not like about the generated software application content as well as any issues that need to be addressed, such as formatting. The information gathered by the feedback engine may then be used to train the second machine learning model. Feedback may also be received in the form of a user accepting or rejecting automatically generated software application content, or a user modifying automatically generated software application content.

According to some embodiments, prompts may be generated by a prompt generation engine. Also, the prompt generation may be achieved by populating templates based on embeddings of documents and information extracted from documents (e.g., filling in the templates based on extracted information or a determination based on the embedding). The prompt generation engine may generate prompts based on an indication of desired intent for a machine learning model. For example, if it is desired for the first machine learning model to extract a first type of information, the prompt generation engine may be configured to provide the first machine learning model with a prompt that directs the first machine learning model to extract a first type of information. The prompt generation engine may generate prompts based on information extracted from documents. For example, if extracted information indicates that a form asks for a user's social security number, the prompt generation engine may generate a prompt containing instructions to generate software application content that asks a user to provide their social security number. 106 liked or did not like about the newly generated software application content 133, as well as any issues that need to be addressed regarding the software application content 133 (e.g., formatting). Feedback 211 may also be received in the form of a user 106 accepting or rejecting software application content 133, or a user 106 modifying newly generated software application content 133 or otherwise providing alternative software application content. The information gathered by the feedback engine 240 may then be used to re-train the first machine learning model 120 and/or the second machine learning model 130. For example, new training data may be generated for the second machine learning model 130 based on the user feedback 211 (e.g., indicating manually corrected or verified software application content) and the second machine learning model 130 may be re-trained based on the new training data for improved accuracy in an interactive feedback loop. While not shown, the first machine learning model 120 may also be re-trained in a similar manner based on user feedback 211. For example, if user feedback 211 includes a verification of newly generated software application content 133, extraction of information may be considered user-verified, and so may be used as new training data to re-train the first machine learning model 120. Similarly, if user feedback 211 indicates that the software application content 133 contains errors (e.g., it incorporates irrelevant information or omits important information), the extracted information may be used as negative training data or a modified selection of extracted information may be used as new training data to re-train the first machine learning model 120.

Figure 3A:
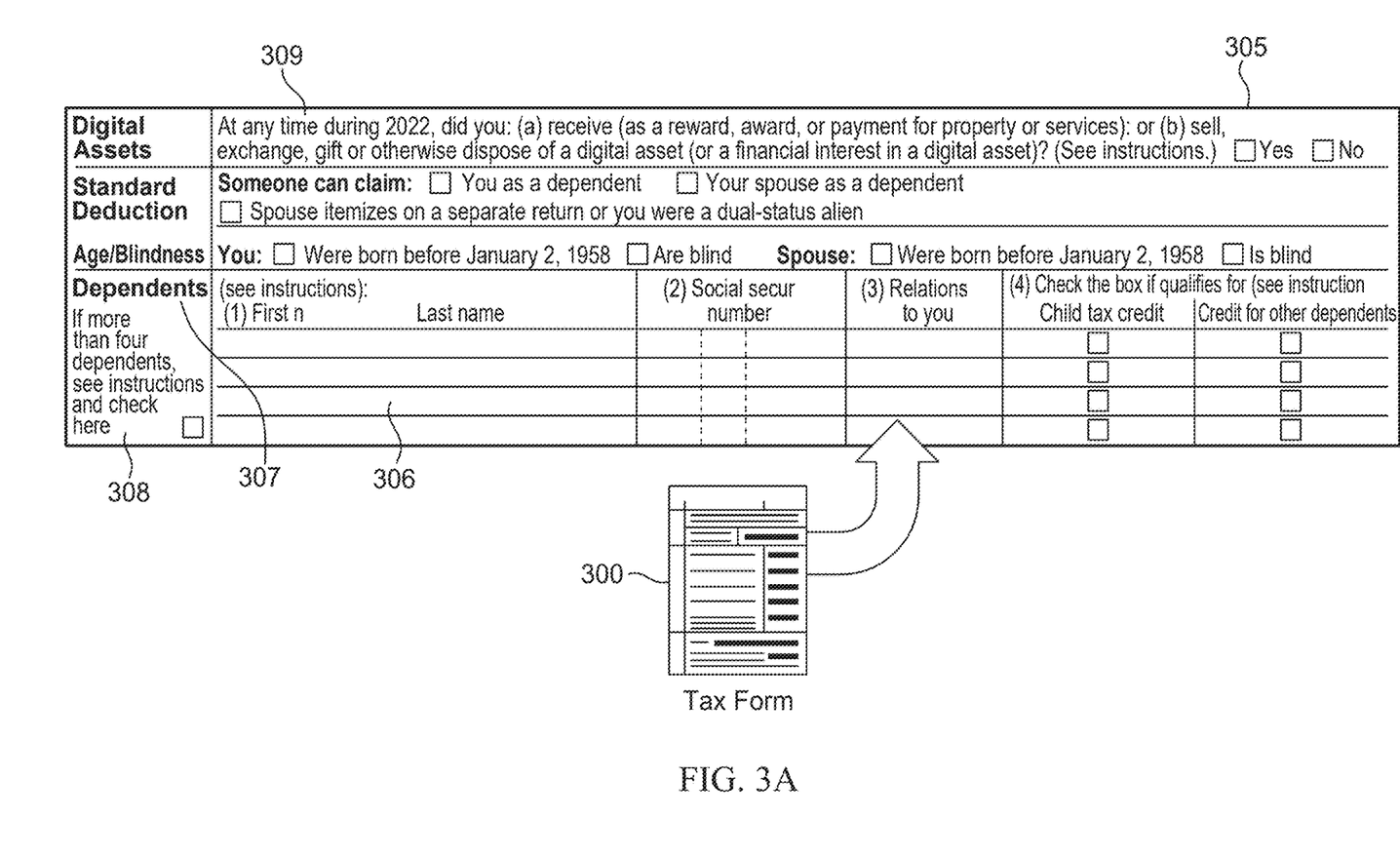
FIG. 3A depicts an example of a form and a document related to a form that may be used to generate software application content.
Figure 3B:
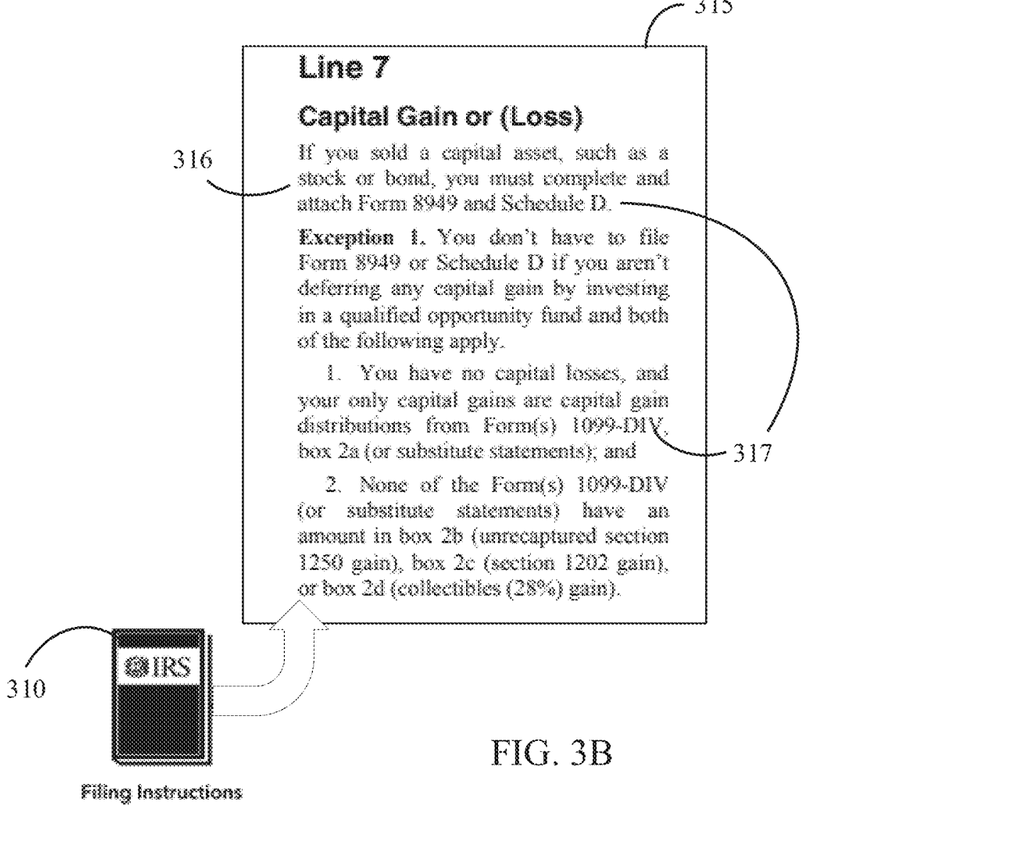
FIG. 3B depicts an example of a document related to a form that may be used to generate software application content.

Example of a Form and a Document Related to a Form That May Be Used to Generate Software Application Content FIG. 3A depicts an example of a form 300 from which information may be extracted to generate software application content. FIG. 3B depicts an example of a document related to a form 310.

In some embodiments, the form 300 may be a tax form, as shown in FIG. 3A. The contents 305 of the form 300 may be extracted by the first machine learning model. The contents 305 may include blank fields 306 such as the first name/last name fields shown in FIG. 3A. When provided with an embedding of the form 300 shown in FIG. 3A, based on the text "First name" and "Last name" that appears over the four rows, the first machine learning model may determine that the form 300 contains four first name/last name fields. Also, a form 300 may contain context clues and/or positional information such as headings 307 that help the first machine learning model determine the type of the field. Based on the heading 307 for the fields ("Dependents"), the first machine learning model may further determine that the four first name/last name fields 306 are for listing the people that a user claims as dependents. Further, the first machine learning model may extract additional information about the fields, such as directions 308 that are based on inputs to the fields. The directions 308 shown in FIG. 3A indicate that if the user has more than four dependents, the user should check a box and see a set of instructions associated with the form. The first machine learning model may extract information about this field from the instructions associated with the form. Based on the information extracted from this form and the instructions, the second machine learning model may generate software application content. The software application content may result in a software application that asks users to list their dependents. For example, the software application content may be an artifact (e.g., JSON file) including content such as interview questions or instructions related to the form, and the software application may use the content to present questions, instructions, and/or other information to the user in order to assist the user with completing the form. The software application may populate the first name/last name fields 306 with the first four dependents indicated by the user. Then, the software application may check the box on the form that indicates the user has more than four dependents. The software application may then prompt the user with more questions based on the information contained in the instructions that were indicated by the directions 308.

A form may also contain multiple choice fields 309. The multiple choice field 309 shown in FIG. 3A asks users if they received or disposed of digital assets in the year 2022, and the possible answers are "yes" and "no." The multiple choice field 309 also directs users to see a set of instructions associated with the form. The first machine learning model may extract this information from the field based on the text of the field and the multiple choice boxes within the field. Based on this extracted information, the first machine learning model may extract information about this field from the instructions associated with the form. Then, based on the information extracted from this form and the instructions, the second machine learning model may generate software application content. The software application content may result in a software application that asks users to select either yes or no with regards to whether they received or disposed of digital assets in 2022. The software application may also provide the users with guidance based on the information extracted from the instructions associated with the form.

According to some embodiments, information may also be extracted from other documents related to a form 310. The document related to a form 310 shown in FIG. 3B is a set of tax filing instructions. The contents 315 of the documents related to the form 310 may be extracted by the first machine learning model. The contents 315 may include individual instructions 316. The instructions 316 may contain references to other forms 317, as does the instruction 316 shown in FIG. 3B. Though not shown, forms may also contain references to other forms 317. The instructions 316 indicate that users must complete the referenced forms 317 if they sold capital assets. This information may be extracted by the first machine learning model. Upon extracting this information, the first machine learning model may then extract information from the referenced forms 317.

Based on the information extracted from one or more forms and the other related document 310 as shown in FIG. 3B, the second machine learning model may generate software application content such as a JSON file containing interview questions, instructions, and/or other content related to the one or more forms. The software application content may result in a software application that guides a user to either complete or omit Form 8949 and Schedule D based on the user's capital gains for the year.

Example Operations Related to Generating Software Application Content

Figure 1:
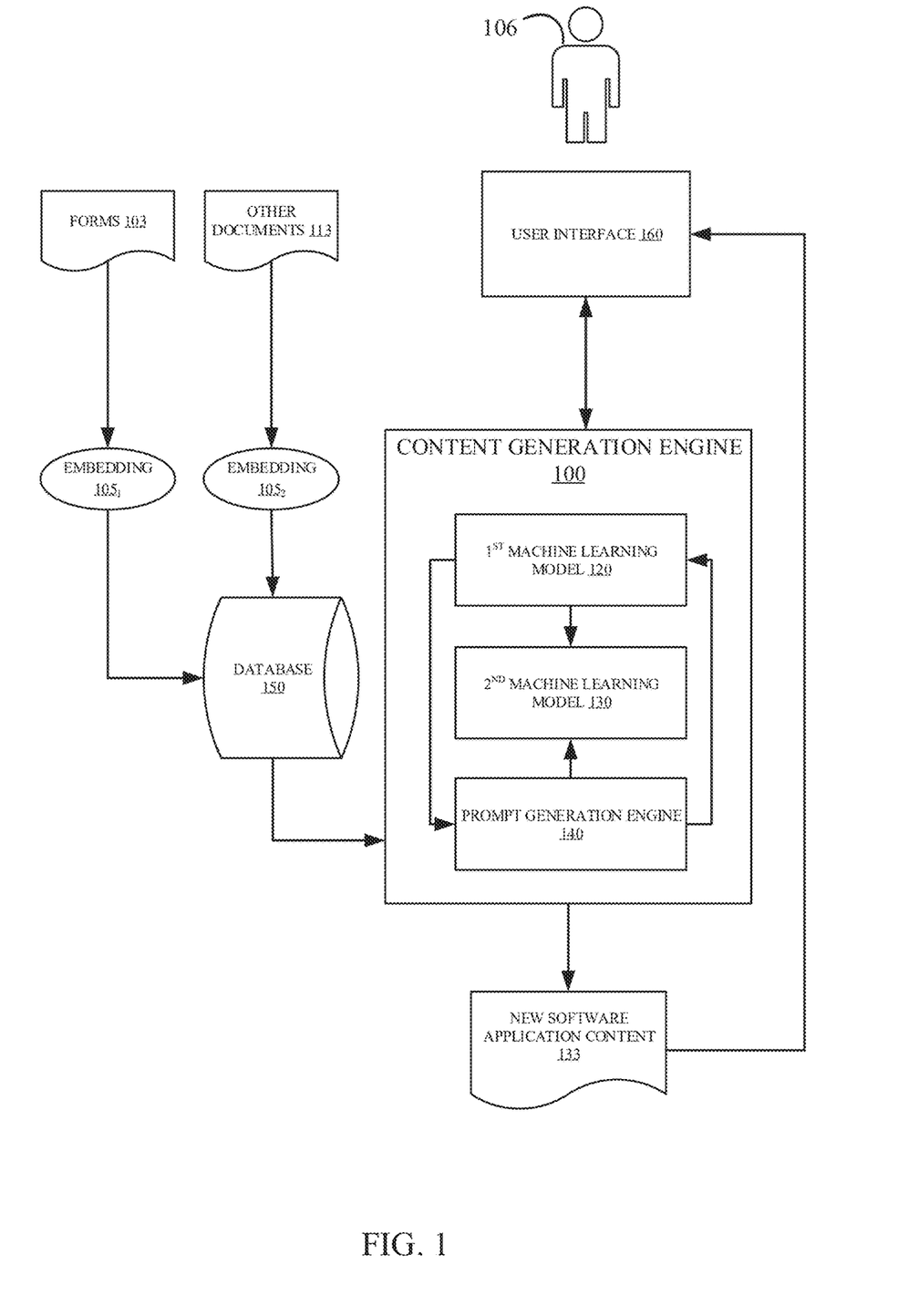
FIG. 1 depicts an example of computing components related to generating software application content.
Figure 2:
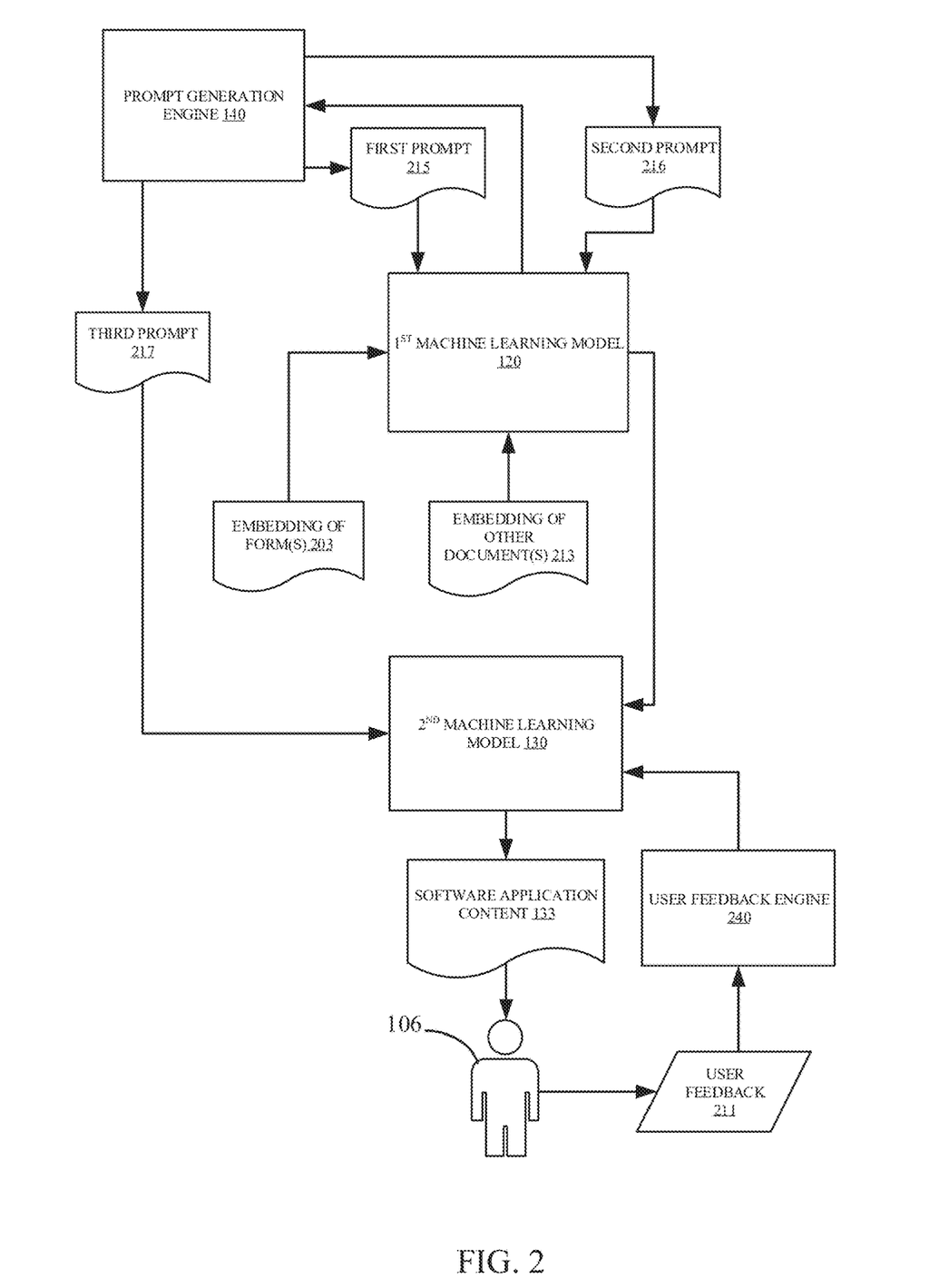
FIG. 2 depicts an example of computing components related to generating software application content.
Figure 4:
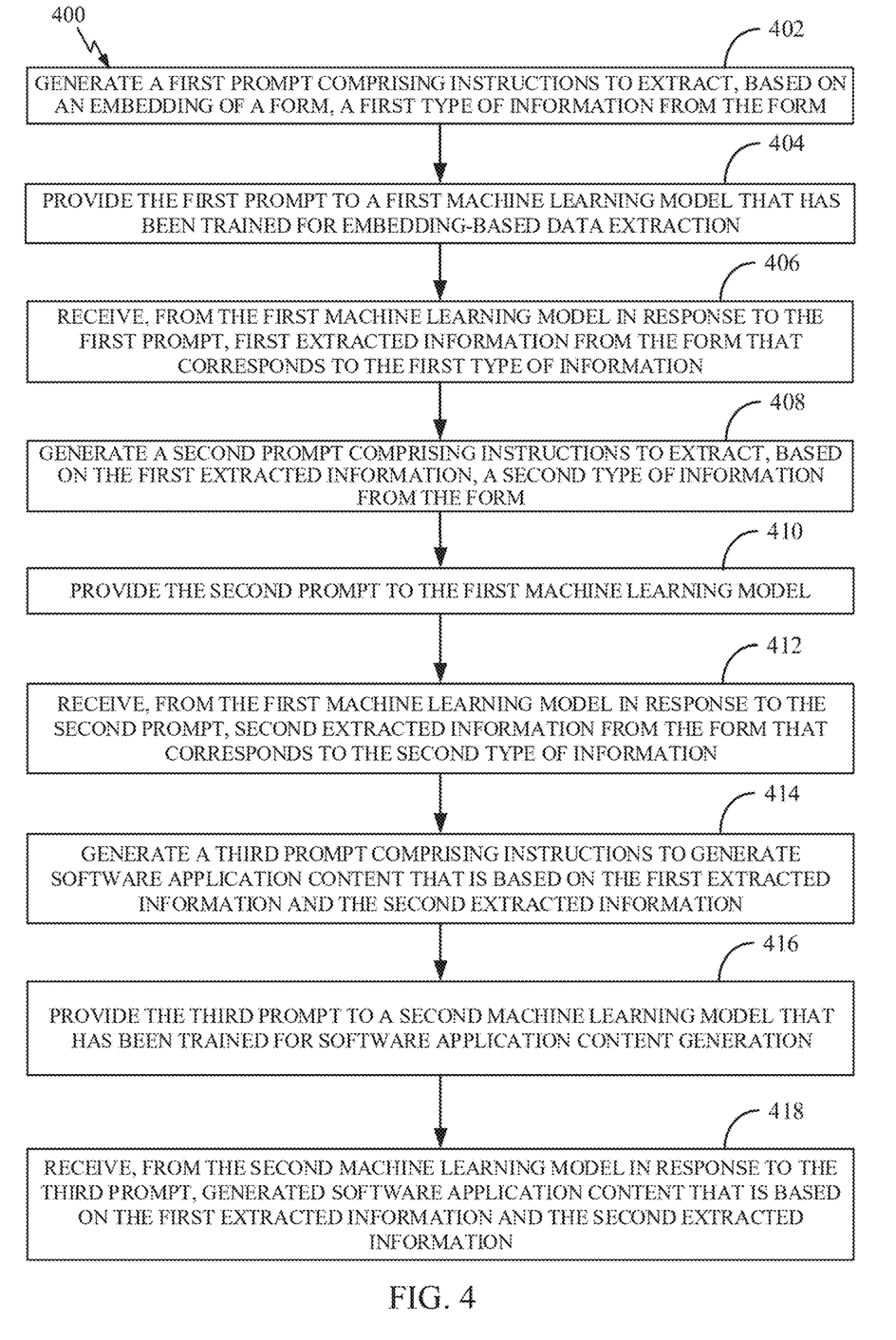
FIG. 4 depicts example operations related to generating software application content.
Figure 5:
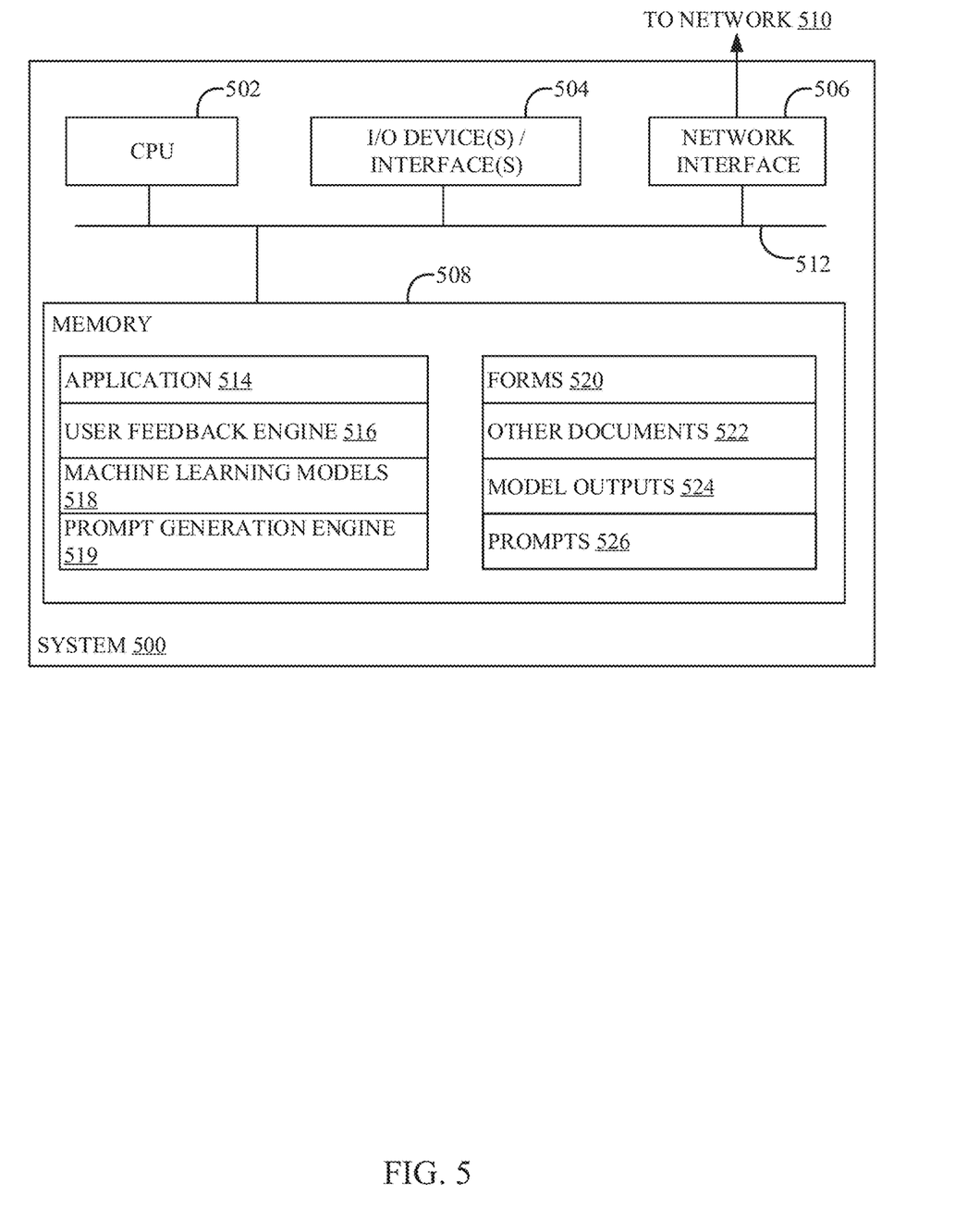
FIG. 5 depicts an example of a processing system for generating software application content.

FIG. 4 depicts example operations 400 related to generating software application content. For example, operations 400 may be performed by one or more of the components described in FIG. 1 and FIG. 2.

Operations 400 begin at step 402 with generating a first prompt comprising instructions to extract, based on an embedding of a form, a first type of information from the form. In some embodiments, the first type of information extracted from the form comprises fields of the form. Certain embodiments provide that the first prompt may be generated based on an indication of a desired action for the first machine learning model, such as extracting fields from a tax form. According to certain embodiments, the form may be a tax form.

Operations 400 continue at step 404 with providing the first prompt to a first machine learning model that has been trained for embedding-based data extraction. Certain embodiments provide that the first machine learning model is a natural language processing model such as a large language model. than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating software application content related to forms, comprising:
    processing a form through an encoder layer of an embedding model to generate an embedding representation of the form;
    providing the embedding representation of the form and a first prompt comprising instructions to extract a first type of information from the form to a first machine learning model that has been trained for embedding-based data extraction;
    receiving, from the first machine learning model in response to the first prompt, first extracted information from the form that corresponds to the first type of information;
    generating a second prompt comprising instructions to extract, based on the first extracted information, a second type of information from the form, wherein the second prompt is generated by populating a given template based on the first extracted information;
    providing the second prompt to the first machine learning model;
    receiving, from the first machine learning model in response to the second prompt, second extracted information from the form that corresponds to the second type of information;
    generating a third prompt comprising instructions to generate software application content that is based on the first extracted information and the second extracted information, wherein the third prompt is generated by populating a particular template based on the first extracted information and the second extracted information; and
    processing the third prompt through nodes of a second machine learning model to generate software application content based on the first extracted information and the second extracted information, wherein the second machine learning model is trained for software application content generation.

2. The method of claim 1, further comprising providing embeddings of one or more other documents along with the first prompt to the first machine learning model, wherein the first machine learning model extracts related information from the one or more other documents based on determining that the related information is related to the form.

3. The method of claim 2, further comprising providing the related information that was extracted by the first machine learning model along with the third prompt to the second machine learning model, wherein the generated software application content is based further on the related information.

4. The method of claim 3, wherein the one or more other documents include one or more interview questions designed to automatically guide a user through populating the form.

5. The method of claim 3, wherein the related information comprises software application metadata associated with the one or more other documents.

6. The method of claim 3, wherein the form is a tax form, and the related information comprises tax filing instructions.

7. The method of claim 1, wherein the first machine learning model is a large language model.

8. The method of claim 1, wherein the second machine learning model is a generative machine learning model.

9. The method of claim 1, wherein the second machine learning model is retrained based on user feedback with respect to the generated software application content.

10. The method of claim 1, wherein the first type of information comprises fields, and the second type of information comprises information about the fields.

11. The method of claim 1, wherein the software application content comprises a JavaScript Object Notation (JSON) file.

12. The method of claim 1, wherein the software application content comprises one or more newly generated interview questions designed to automatically guide a user through populating the form.

13. A system for generating software application content related to forms, comprising:
    one or more processors; and
    a memory comprising instructions that, when executed by the one or more processors, cause the system to:

process a form through an encoder layer of an embedding model to generate an embedding representation of the form;

provide the embedding representation of the form and a first prompt comprising instructions to extract a first type of information from the form to a first machine learning model that has been trained for embedding-based data extraction;

receive, from the first machine learning model in response to the first prompt, first extracted information from the form that corresponds to the first type of information;

generate a second prompt comprising instructions to extract, based on the first extracted information, a second type of information from the form, wherein the second prompt is generated by populating a given template based on the first extracted information;

provide the second prompt to the first machine learning model;

receive, from the first machine learning model in response to the second prompt, second extracted information from the form that corresponds to the second type of information;

generate a third prompt comprising instructions to generate software application content that is based on the first extracted information and the second extracted information, wherein the third prompt is generated by populating a particular template based on the first extracted information and the second extracted information; and process the third prompt through nodes of a second machine learning model to generate software application content based on the first extracted information and the second extracted information, wherein the second machine learning model is trained for software application content generation.

14. The system of claim 13, further comprising providing embeddings of one or more other documents along with the first prompt to the first machine learning model, wherein the first machine learning model extracts related information from the one or more other documents based on determining that the related information is related to the form.

15. The system of claim 14, further comprising providing the related information that was extracted by the first machine learning model along with the third prompt to the second machine learning model, wherein the generated software application content is based further on the related information.

16. The system of claim 15, wherein the one or more other documents include one or more interview questions designed to automatically guide a user through populating the form.

17. The system of claim 15, wherein the related information comprises software application metadata associated with the one or more other documents.

18. The system of claim 15, wherein the form is a tax form, and the related information comprises tax filing instructions.

19. The system of claim 13, wherein the first machine learning model is a large language model.

20. A non-transitory computer-readable medium comprising instructions that, when executed by one or more processors of a computing system, cause the computing system to:

process a form through an encoder layer of an embedding model to generate an embedding representation of the form;

provide the embedding representation of the form and a first prompt comprising instructions to extract a first type of information from the form to a first machine learning model that has been trained for embedding-based data extraction;

receive, from the first machine learning model in response to the first prompt, first extracted information from the form that corresponds to the first type of information;

generate a second prompt comprising instructions to extract, based on the first extracted information, a second type of information from the form, wherein the second prompt is generated by populating a given template based on the first extracted information;

provide the second prompt to the first machine learning model;

receive, from the first machine learning model in response to the second prompt, second extracted information from the form that corresponds to the second type of information;

generate a third prompt comprising instructions to generate software application content that is based on the first extracted information and the second extracted information, wherein the third prompt is generated by populating a particular template based on the first extracted information and the second extracted information; and process the third prompt through nodes of a second machine learning model to generate software application content based on the first extracted information and the second extracted information, wherein the second machine learning model is trained for software application content generation.

* * * * *